March 10, 1970 R. L. PAGE 3,499,608

MANURE SHREDDER

Filed July 31, 1967 3 Sheets-Sheet 1

Roy L. Page
INVENTOR.

BY Clarence A. O'Brien
and Harvey B. Jacobson
Attorneys

MANURE SHREDDER
Filed July 31, 1967 3 Sheets-Sheet 2
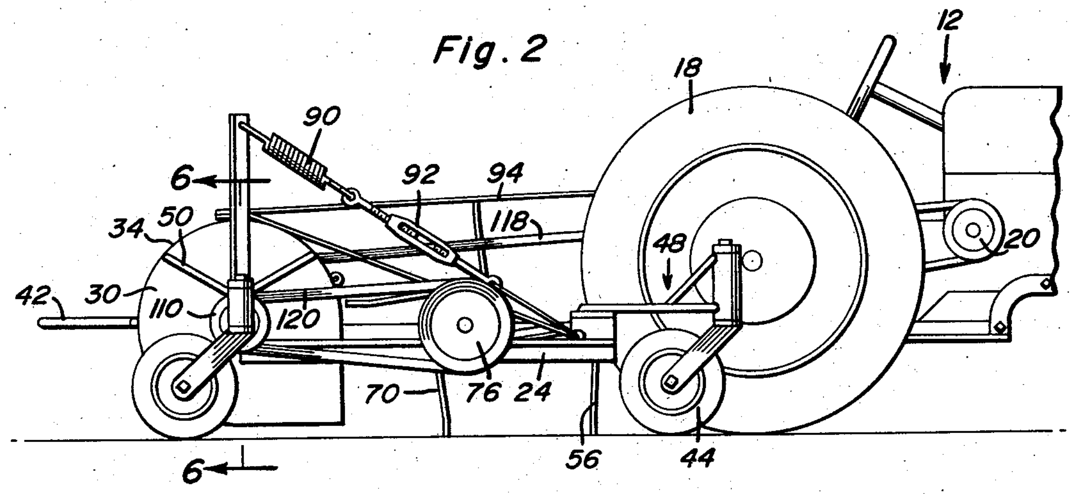
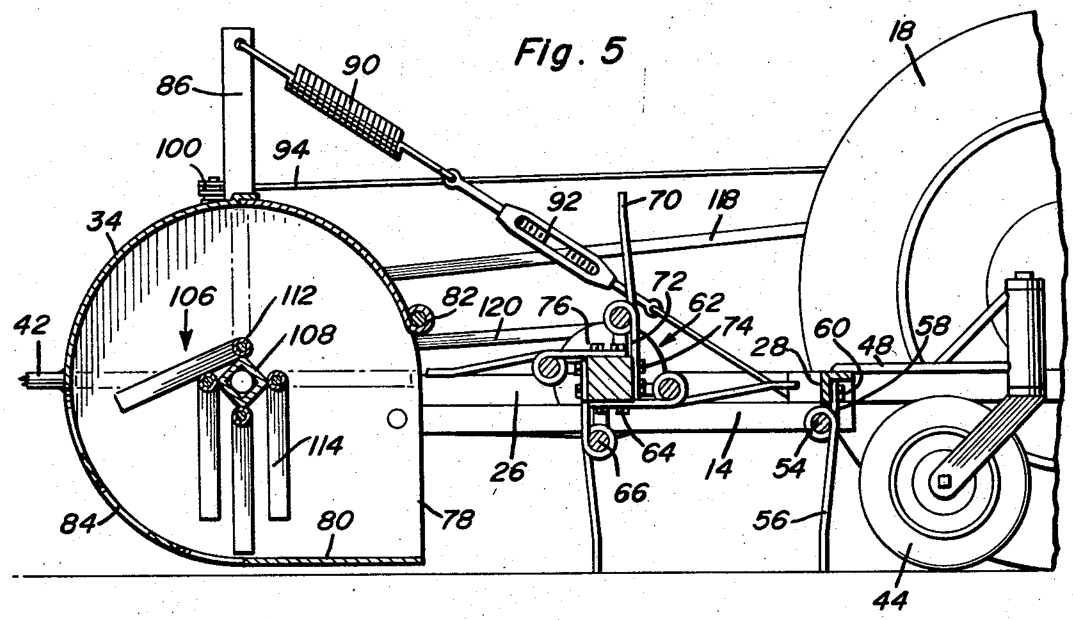
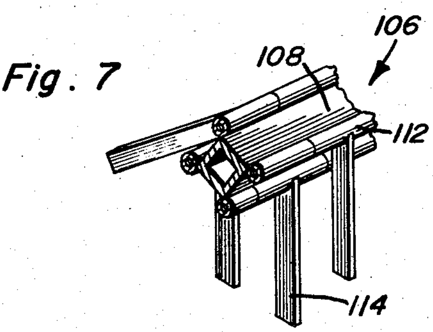
Roy L. Page
INVENTOR.
BY Clarence A. O'Brien and Harvey B. Jacobson
Attorneys March 10, 1970 R. L. PAGE 3,499,608

MANURE SHREDDER

Filed July 31, 1967 3 Sheets-Sheet 3

Roy L. Page
INVENTOR.

BY Clarence A. O'Brien
and Harvey B. Jacobson
Attorneys

United States Patent Office 3,499,608

Patented Mar. 10, 1970

1

3,499,608

MANURE SHREDDER

Roy L. Page, Rte. 2, Box 197, Snyder, Tex. 79549

Filed July 31, 1967, Ser. No. 657,111
Int. Cl. B02b 9/04
U.S. Cl. 241—101 5 Claims

ABSTRACT OF THE DISCLOSURE

A tractor-towed machine raking and displacing piles of manure lying on the ground into a housing enclosing a shredder. The shredder grinds and expels the manure in particle form rearwardly from openings in the housing for distribution on the ground as fertilizer. A power take-off on the tractor drives the shredder and a pick-up device which displaces the raked manure into the shredder housing.

This invention pertains to a farm machine adapted to be towed by a tractor vehicle and more particularly to wheeled apparatus for removing piles of manure from a pasture and redistributing it in particle form.

Very often, a pasture becomes contaminated with cow dung or droppings that pile up at various locations interfering with continued grazing of cattle. As a result thereof, a considerable amount of time and effort is required to rake and collect the manure and remove it.

The apparatus of the present invention alleviates the foregoing problem with the expenditure of less time and effort and with certain advantages. Therefore, in accordance with the present invention a wheeled apparatus extending rearwardly and laterally of a towing tractor vehicle is moved across the pasture to be cleaned in order to sequentially rake, collect and shred manure for redistribution in particle form on the ground. The manure when so conditioned by the shredder and dedistributed, will serve as a fertilizer without interfering with cattle grazing.

The apparatus of the present invention is constructed in order to serve the specialized purpose aforementioned. Toward this end, a rake assembly having downwardly extending raking fingers initially rakes matter lying on the ground so as to loosen and break up any piles of manure which is then picked up by a rotating pick-up device and flung into a housing which encloses a shredder assembly. The shredder assembly grinds the manure and forces it out openings in the housing so that it may be redistributed on the ground in particle form. The shredder and pick-up device are accordingly rotated at the proper relative speeds by a power take-off mechanism associated with the tractor vehicle. The raking assembly and pick-up device may be controlled by the operator seated on the tractor vehicle to interrupt operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the apparatus shown in FIGURE 1.

FIGURE 5 is an enlarged transverse sectional view taken substantially through a plane indicated by section line 5—5 in FIGURE 1.

2

FIGURE 7 is a partial perspective view of a portion of the shredder device.

Figure 8:
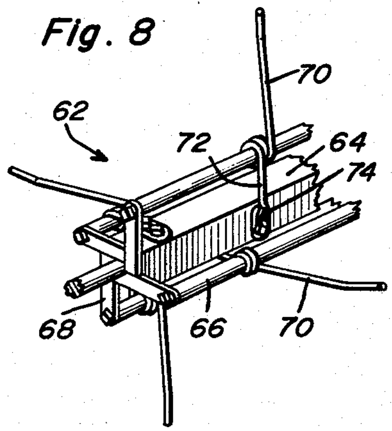

FIGURE 8 is a partial perspective view of a portion of the pick-up device.

Figure 1:
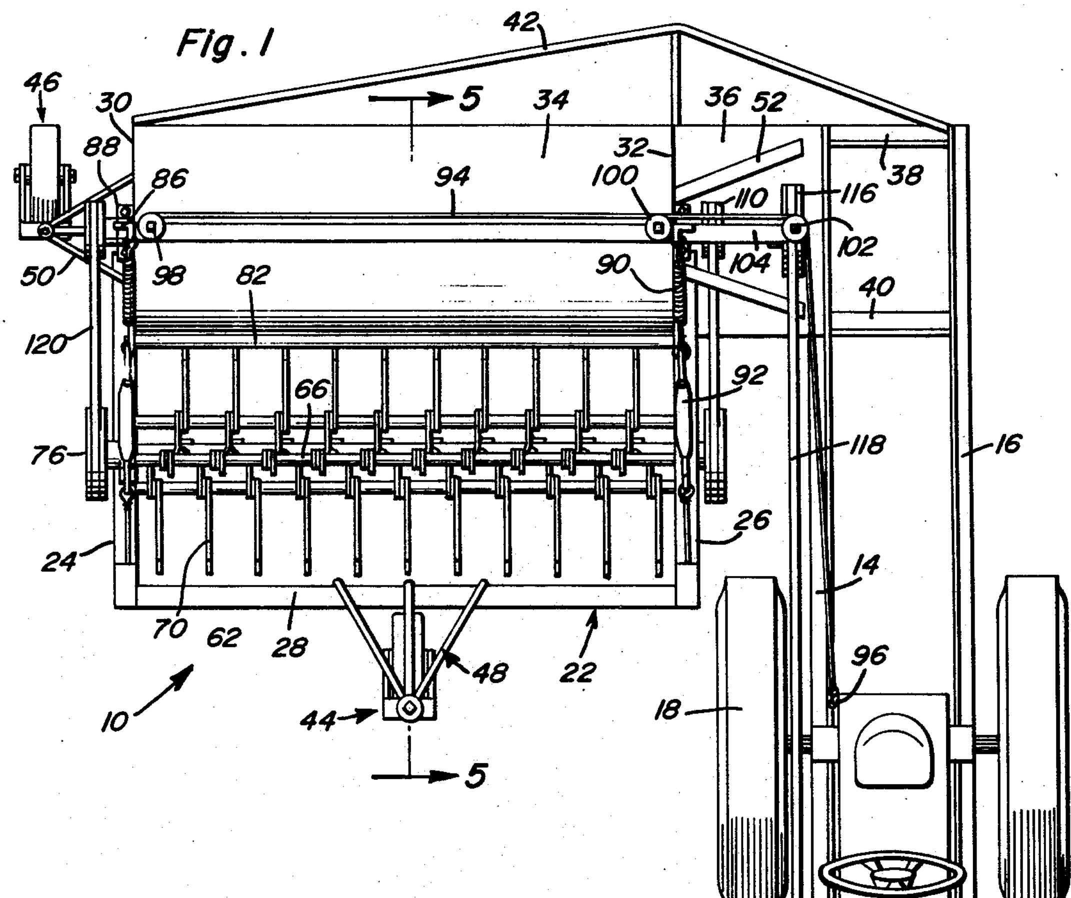
FIGURE 1 is a top plan view of the apparatus of the present invention.

Referring now to the drawings in detail, and initially to FIGURE 1, it will be observed that the apparatus of the present invention generally referred to by reference numeral 10 is adapted to be towed in a forward direction by a tractor vehicle generally referred to by reference numeral 12. The apparatus is disposed rearwardly and laterally of the vehicle 12 to which it is connected by means of side bars 14 and 16 mounted on the sides of the vehicle and extending rearwardly therefrom a substantial distance. The tractor vehicle is of a conventional type including the relatively large rear traction wheels 18 and a power take-off drive mechanism 20 preferably located on that side of the tractor from which the apparatus 10 extends laterally. The moving parts of the apparatus are driven by the power take-off mechanism as will be hereafter explained.

The apparatus includes a subframe assembly generally referred to by reference numeral 22 which includes a pair of laterally spaced side frame members 24 and 26 interconnected at the forward ends thereof by a front frame member 28. The rear ends of the side frame members 24 and 26 are pivotally connected to the axial ends 30 and 32 of a generally tubular housing 34. A platform 36 extends laterally from the end 32 of the housing 34 and is connected by the frame members 38 and 40 to the side bars 14 and 16 that extend rearwardly from the tractor vehicle. Thus, the frame assembly 22 is pivotally mounted by the side bars. Bracing 42 interconnects the housing 34 to the side bars in order to form a rigid support. Further, the frame assembly 22 is supported on the ground by a forward dirigible wheel assembly 44 while a rearward dirigible wheel assembly 46 supports the housing and the side bars. The forward wheel assembly 44 is rotatably mounted about a vertical axis established by means of the support bracket 48 that is connected to the front frame member 28 and extends forwardly therefrom. The rear wheel assembly 46 on the other hand is similarly mounted for rotation about a vertical steering axis by means of a support bracket 50 that extends laterally from the end wall 30 of the housing 34. Bracing elements 52 also interconnect the opposite side wall 32 of the housing with the platform 36.

Figure 3:
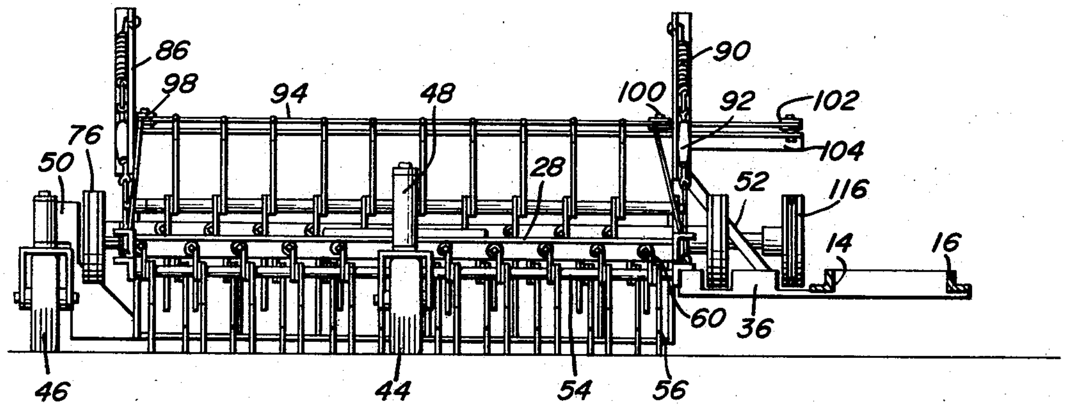
FIGURE 3 is a front elevational view of the apparatus.

Referring now to FIGURES 2, 3 and 5 it will be observed that the frame member 28 mounts a raking assembly supported by a rod 54 fixedly mounted in parallel spaced relation below the front frame member 28. A plurality of laterally spaced flexible raking fingers 56 extend downwardly from the rod 54 about which they are pivotally mounted. Each raking finger includes an upper anchoring portion 58 secured to the front frame member 28 by a fastener 60. Thus, the raking fingers are operative to loosen and break-up piles of manure lying on the ground in response to forward movement of the apparatus by the tractor vehicle to which it is connected.

Rotatably mounted between the side frame members 24 and 26 rearwardly of the raking assembly is a pick-up device generally referred to by reference numeral 62 as more clearly seen in FIGURES 5 and 8. The pick-up device includes a noncircular shaft 64 centrally located between angularly spaced rods 66 that are secured to the end portions of the shaft 64 by the fastening links 68. Each rod 66 mounts a plurality of laterally spaced pick-up fingers 70 that extend generally radially relative to the rotational axis of the shaft 64, each pick-up finger being anchored to one side of the shaft 64 by an anchor arm 72 and fasteners 74. The rotational axis for the shaft 64 is disposed slightly above the supporting rod 54 for the raking assembly so that the pick-up fingers 70 may extend radially from the rod 66 into engagement with the ground in rearward spaced relation to the raking fingers 56 as the shaft 64 is rotated. Pulley wheels 76 are fastened to opposite ends of the shaft 64 so that rotation may be imparted thereto in a clockwise direction as viewed in FIGURE 5. It will be appreciated therefore, that in response to rotation of the pick-up device 62, manure that has been loosened by the raking fingers 56 will be displaced or flung into the housing 34.

Figure 4:
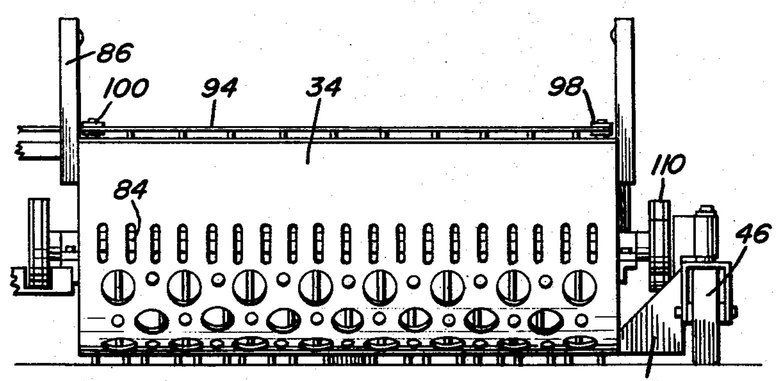
FIG. 4 is a rear elevational view of the apparatus.
Figure 6:
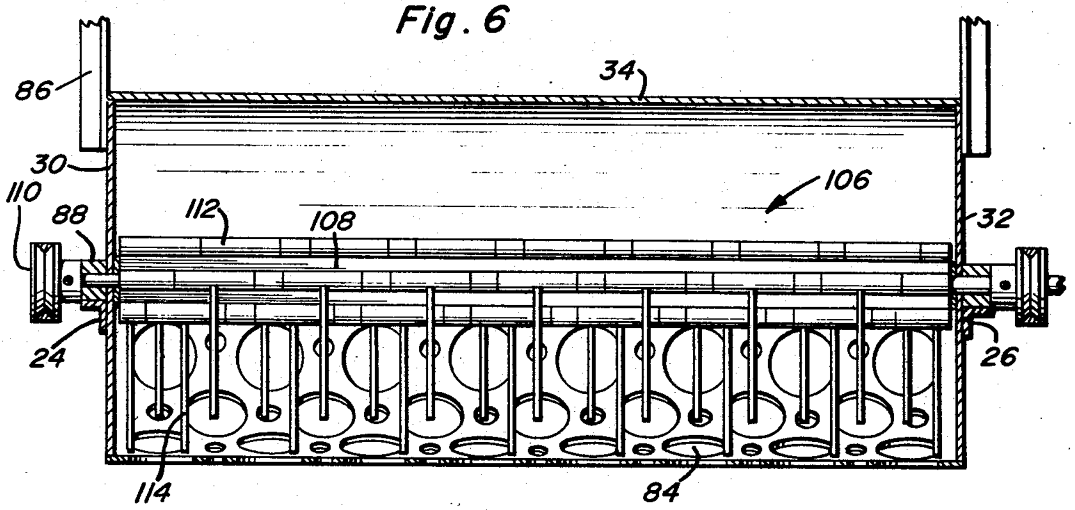
FIGURE 6 is an enlarged transverse sectional view taken substantially through a plane indicated by section line 6—6 in FIGURE 2.

The housing 34 is provided with a lateral inlet opening ing 78 disposed rearwardly of the pick-up device 62 and defined between the lower flat floor portion 80 of the housing and an upper beaded portion 82. Also, openings 84 of different sizes and shapes are formed along a rearward and lower perforated quadrant of the housing 34. The top portion of the housing is imperforate as more clearly seen in FIGURES 4, 5 and 6 so that manure in particle form may be extruded and discharged rearwardly and downwardly from the housing for distribution on the ground.

A pair of bars 86 are secured to and extend upwardly from the end walls 30 and 32 of the housing. The frame assembly 22 is pivotally connected to the housing about a transverse axis established by the side bearing assemblies 88 supported at the rear ends of the side frame members 24 and 26. A pair of tension regulating springs 90 are connected to the upper ends of the bars 86, the opposite ends of the springs being anchored by adjustable turnbuckle linkages 92 to the forward end of the frame assembly 22. Also, the frame assembly 22 may be angularly displaced upwardly from its operative position under control of an operator on the vehicle by means of a cable 94 one end of which is anchored adjacent the forward end of the frame assembly, while the other end is connected to an adjusting lever 96 mounted on the vehicle as shown in FIGURE 1. The cable 94 is therefore entrained about idler pulleys 98 and 100 rotatably mounted on the top of the housing 34 adjacent the opposite ends thereof and an idler pulley 102 rotatably mounted by an extension 104 projecting from the side of the housing as more clearly seen in FIGURES 1 and 3.

The housing 34 encloses a shredder assembly generally referred to by reference numeral 106 adapted to grind or comminute the manure which is flung into the housing 34 through the opening 78 as aforementioned. The shredder assembly includes a non-circular shaft 108 which is journaled at the ends thereof by the bearing assemblies 88 and to which the pulley wheels 110 are connected. Mounted at the corners of the tubular shaft 108, are axially spaced hinges 112, the hinges along the respective corners of the shaft 108 being staggered so as to avoid interference between the bars or blades 114 that extend from each of the hinges 112. The bars 114 are loosely pivoted so that they will extend radially from the shaft 108 under the influence of centrifugal force during rotation of the shaft. Rotation is imparted to the shaft at one end by means of the drive pulley 116 disposed in axially spaced relation to one of the pulleys 110 aforementioned. An endless drive belt 118 drivingly interconnects the power take-off mechanism 20 with the drive pulley 116. Drive belts 120 on the other hand drivingly interconnect the pulleys 110 with the pulleys 76 in order to transmit rotation to the pick-up device 62 at a lower speed than the rotational speed of the shredder device. Further, both the pick-up device and the shredder device are rotated in the same direction or clockwise as viewed in FIGURE 5. Rotation of the shredder device 106 will through the bars 114 grind the manure and discharge it rearwardly from the housing through the openings 84 in particle form. Also, as an alternative the pick-up device 62 could be constructed in the same way as the shredder 106 so as to avoid the use of spring fingers.

The springs 90 reduce the load imposed on the frame assembly 22 by the weight of the rake assembly and the pick-up device in order to regulate the tension on the drive belts 120 which interconnect the pulleys 76 with the pulleys 110 rotatable about the axis on which the frame 22 is pivoted. The belt tension may be slackened to interrupt drive by upward displacement of the frame 22 as aforementioned. It will also be apparent that the pivotal mounting of the frame 22 provides the yieldability necessary to avoid damage to the pick-up device and rake because of rocks and ground irregularities.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a towing vehicle, a wheeled frame assembly connected to the vehicle for forward movement, apparatus mounted by the frame assembly for redistributing solid matter lying on the ground in particulate form comprising flexible rake means non-rotatably mounted by the frame assembly and extending downwardly toward the ground for raking said solid matter to loosen the same, pick-up means rotatably mounted by the frame assembly rearwardly of the flexible rake means for rearwardly and upwardly displacing the solid matter relative to the frame assembly in response to forward movement thereof, a housing mounted rearwardly of the pick-up means on the frame assembly to receive said solid matter, and shredding means rotatably mounted in the housing for comminuting the solid matter into particulate form and displacing the same rearwardly from the housing through openings formed therein.

2. The combination of claim 1 wherein said frame assembly includes a supporting wheel mounted laterally of the housing and a dirigible wheel mounted forwardly of the flexible rake means.

3. The combination of claim 2 wherein said frame assembly extends rearwardly from the towing vehicle and laterally thereof.

4. The combination of claim 1 wherein said frame assembly includes a subframe pivotally connected to the housing and supporting the rake means and the pick-up means thereon, drive means drivingly connecting the shredding means to the pick-up means for rotation of the pick-up means at a lower speed, and drive regulating means interconnecting the housing with the subframe.

5. The combination of claim 1 wherein said housing includes a floor portion connected to a rear perforated portion from which the solid matter is extruded downwardlly through said openings and an imperforate top portion, said floor and top portions of the housing forming an inlet spaced rearwardly of the pick-up means.

References Cited

UNITED STATES PATENTS

| | | | |
|---|---|---|---|
| 909,576 | 1/1909 | Frost | 241—101 |
| 1,053,467 | 2/1913 | Allen | 146—117 |
| 2,347,664 | 5/1944 | Chilton | 146—121 |
| 2,368,331 | 1/1945 | Seaman | 241—101 |
| 2,661,584 | 12/1953 | Ronning | 146—124 |
| 2,856,134 | 10/1958 | Tormey | 241—186 |
| 2,988,367 | 6/1961 | Erny | 241—101 |
| 3,011,793 | 12/1961 | McElhinney et al. | 241—101 |
| 2,302,973 | 1/1942 | Sargent | 241—86 |

GERALD A. DOST, Primary Examiner

U.S. Cl. X.R.

146—117